March 12, 1935.    J. FERNANDEZ    1,994,018
AUXILIARY AIRPLANE PROPELLER
Filed Oct. 8, 1934

INVENTOR
JOSE FERNANDEZ
BY
ATTORNEY

Patented Mar. 12, 1935

1,994,018

UNITED STATES PATENT OFFICE 1,994,018

AUXILIARY AIRPLANE PROPELLER

Jose Fernandez, Newark, N. J.

Application October 8, 1934, Serial No. 747,296

6 Claims. (Cl. 244—25)

This invention relates to new and useful improvements in an auxiliary airplane propeller for airplanes.

The invention has for an object the association of an auxiliary airplane propeller and mechanism for its operation upon an airplane so that in the event the standard propeller of the airplane or its engine becomes damaged or unusable, the auxiliary unit may be placed into operation and the airplane brought to a safe landing.

Still further, the invention particularly proposes to mount the auxiliary propeller upon a shaft having two sections pivotally connected and arranged in such a fashion that the front section with the propeller may assume a bent position constituting the normal inoperative position of the propeller so that it is not caused to rotate during the travel of the airplane.

Furthermore, it is another object of this invention to arrange a mechanism whereupon operation of a push button switch the front section of the propeller section is moved to an operative position so that the propeller is ready to be operated.

Another object of the invention is the construction of a device as mentioned which is simple and durable and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Figure 1:
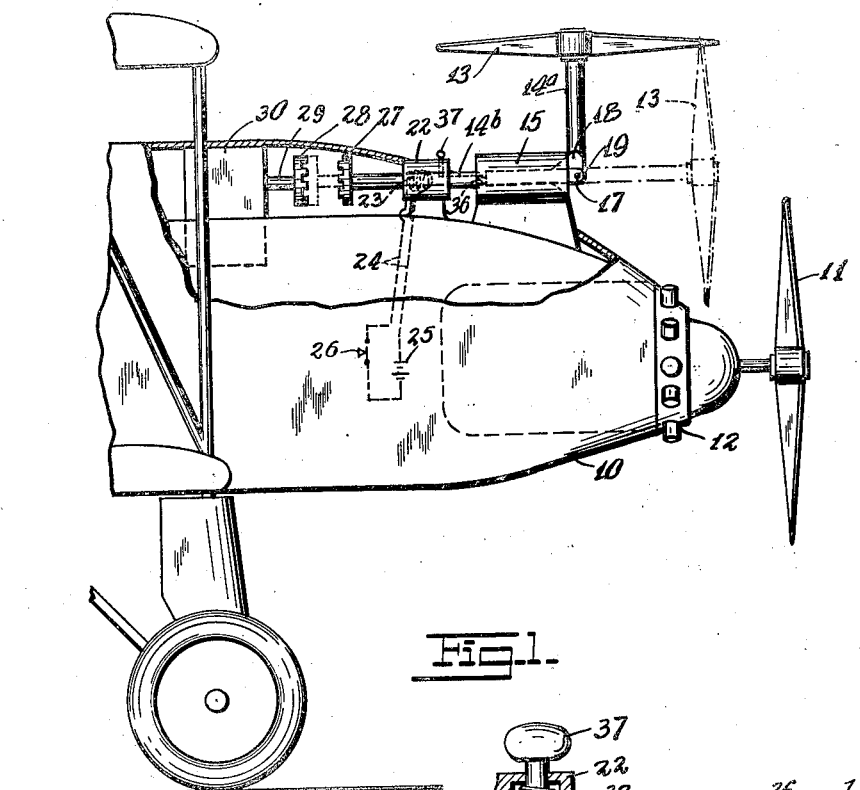
Fig. 1 is a fragmentary side elevational view of an airplane equipped with an auxiliary airplane propeller according to this invention.
Figure 3:
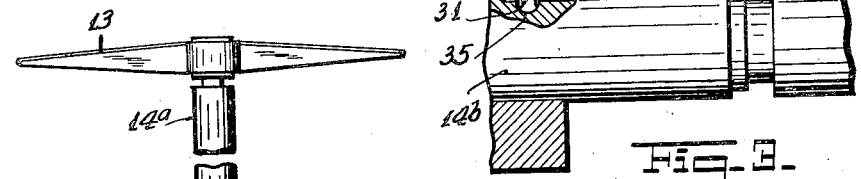
Fig. 3 is a fragmentary enlarged detailed view of a portion of Fig. 1, showing in particular the rear section of the propeller shaft.
Figure 2:
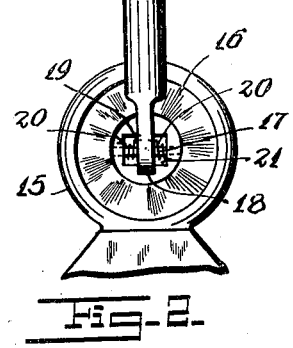
Fig. 2 is a fragmentary end elevational view of a portion of the auxiliary propeller mechanism seen as though looking from the right hand end of Fig. 1.

The auxiliary propeller, according to this invention, is used in combination with a standard airplane 10 having a propeller 11 associated with the engine 12 for its operation. Details of the airplane will not be given in this specification since such details form no part of this invention and are generally known by those skilled in the art.

The auxiliary airplane propeller, according to this invention, comprises a propeller 13 attached upon the front section $14^a$ of a shaft having a rear section $14^b$. The shaft $14^a$, $14^b$ is slidably and rotatively supported in a standard 15 mounted upon the body of the airplane 10. The front end of the standard 15 is formed with a conical shaped recess 16 so as to cam down the front section $14^a$ of the propeller shaft when the propeller shaft is drawn inwards into the standard.

The dot and dash lines in Fig. 1 illustrate the operative position of the propeller 13. The full lines show its inoperative position. The shaft sections $14^a$ and $14^b$ are pivotally connected with a pintle pin 17. One of the ends of the shaft sections is formed with a reduced portion 18 engaging between a forked portion 19 of the other section.

Springs 20 are arranged co-axially upon the pintle pin 17 and are disposed within recesses 21 formed in one of the shaft sections, and said springs act between the sections so as to normally pivot the front shaft section $14^a$ into a position at right angles to the section $14^b$. The construction is such that the propeller shaft may be drawn inwards through the standard 15 to cause the front section $14^a$ to move into a horizontal aligned position with the rear section to be in the operative position. When the propeller shaft is moved frontwards to a position in which the shaft section $10^a$ is free, the springs 20 will automatically move the shaft section into the right angle inoperative position.

The rear shaft section $14^b$ slidably engages through a casing 22 which is mounted upon the body of the airplane. A solenoid 23 is arranged around the shaft section $14^b$ and is mounted within the casing 22 and connects with a circuit 24 having a source of power 25 and a manually operable switch 26. The arrangement is such that the solenoid 23 may be operated to cause the propeller shaft $14^a$, $14^b$ to move rearwards.

A coupling section 27 is mounted upon the rear end of the shaft section $14^b$ and is adapted to interengage and connect with a coupling section 28 upon the shaft 29 of an auxiliary engine 30 mounted upon the airplane body. The dot and dash lines in Fig. 1 show the interengaged position of the coupling. The coupling will be interengaged when the solenoid 23 is operated to move the propeller shaft $14^a$, $14^b$ rearwards.

A plunger 31 is mounted upon the casing 22 and is urged inwards with a spring 32 coaxially upon the plunger and acting between the casing 22 and a flange 33 on the plunger. The inner end of the plunger 31 engages a longitudinal groove 34 upon the shaft section 14b. In the forward position of the shaft section the plunger 31 engages a small recess 35 in the base of groove 34. The groove 34 extends to a peripheral groove 36 having an upper section 36a and a lower section 36b. The upper section 36a is of a size so as to have its periphery coinciding with the base of the longitudinal groove 35. The arrangement is such that the shaft section 14b may move rearwards and the plunger 31 engages the groove section 36b for latching the shaft in the rearwards position, in which position the coupling is engaged. The shaft may be released from its operative position by manually drawing the plunger 31 outwards which is possible because of the provision of a head 37 arranged upon the extended end of the plunger. The plunger is capable of being extended only to a position in which its inner end engages the groove section 36a. Then the shaft may be turned to a position in which the longitudinal slot 34 aligns with the plunger 31 and then the shaft may be extended outwards to its inoperative position.

The operation of the device may be understood by first considering Fig. 1. In the event that trouble develops with the regular propeller 11, then the pilot closes the switch 26 so as to energize the solenoid 23 which will cause the shaft section 14b to move rearwards. Rearward motion of the shaft section 14b causes the shaft section 14a to pivot into alignment and be partially drawn into the standard 15 so that the shaft sections may now freely rotate. When the shaft has moved to its complete rear position, the coupling 27 and 28 will engage, and the plunger 31 will engage the groove section 36b to hold the shaft in this operative position. Then the engine 30 is started in a conventional manner and the propeller 13 will now be operating so that the airplane may seek a safe landing.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In combination with an airplane, a standard with a shaft slidably and rotatively engaged therein, said shaft having a pair of pivotally connected sections arranged with the front section adapted to assume a position at right angles to the rear section, a propeller shaft upon the free end of the front section, resilient means between the shaft sections urging the front section into the right angle position, a stationary casing encircling the rear section of the shaft, a solenoid on said casing for moving the shaft rearwards, an auxiliary engine on the airplane, coupling jaws on the drive shaft of the auxiliary engine and the rear end of said shaft and adapted to engage in the rear position of said shaft, and means for holding the said shaft in its rearward position.

2. In combination with an airplane, a standard with a shaft slidably and rotatively engaged therein, said shaft having a pair of pivotally connected sections arranged with the front section adapted to assume a position at right angles to the rear section, a propeller shaft upon the free end of the front section, resilient means between the shaft sections urging the front section into the right angle position, a stationary casing encircling the rear section of the shaft, a solenoid on said casing for moving the shaft rearwards, an auxiliary engine on the airplane, coupling jaws on the drive shaft of the auxiliary engine and the rear end of said shaft and adapted to engage in the rear position of said shaft, and means for holding the said shaft in its rearward position, the adjacent ends of said shaft sections being formed with inter-engaging parts connected with a pintle pin for the pivotal connection of the shaft sections.

3. In combination with an airplane, a standard with a shaft slidably and rotatively engaged therein, said shaft having a pair of pivotally connected sections arranged with the front section adapted to assume a position at right angles to the rear section, a propeller shaft upon the free end of the front section, resilient means between the shaft sections urging the front section into the right angle position, a stationary casing encircling the rear section of the shaft, a solenoid on said casing for moving the shaft rearwards, an auxiliary engine on the airplane, coupling jaws on the drive shaft of the auxiliary engine and the rear end of said shaft and adapted to engage in the rear position of said shaft, and means for holding the said shaft in its rearward position, said resilient means between the shaft sections comprising springs coaxially upon the pivot of the shaft sections and acting between the sections.

4. In combination with an airplane, a standard with a shaft slidably and rotatively engaged therein, said shaft having a pair of pivotally connected sections arranged with the front section adapted to assume a position at right angles to the rear section, a propeller shaft upon the free end of the front section, resilient means between the shaft sections urging the front section into the right angle position, a stationary casing encircling the rear section of the shaft, a solenoid on said casing for moving the shaft rearwards, an auxiliary engine on the airplane, coupling jaws on the drive shaft of the auxiliary engine and the rear end of said shaft and adapted to engage in the rear position of said shaft, and means for holding the said shaft in its rearward position, comprising a spring urged plunger on said casing engaging in a longitudinal groove in the rear shaft section, and a peripheral recess connected with the longitudinal groove arranged at a position to hold the shaft in its rearward position with the coupling engaged.

5. In combination with an airplane, a standard with a shaft slidably and rotatively engaged therein, said shaft having a pair of pivotally connected sections arranged with the front section adapted to assume a position at right angles to the rear section, a propeller shaft upon the free end of the front section, resilient means between the shaft sections urging the front section into the right angle position, a stationary casing encircling the rear section of the shaft, a solenoid on said casing for moving the shaft rearwards, an auxiliary engine on the airplane, coupling jaws on the drive shaft of the auxiliary engine and the rear end of said shaft and adapted to engage in the rear position of said shaft, and means for holding the said shaft in its rearward position, comprising a spring urged plunger on said casing engaging in a longitudinal groove in the rear shaft section, and a peripheral recess connected with the longitudinal groove arranged at a position to hold the shaft in its rearward position with the coupling engaged, said peripheral groove having a shallow portion and a deeper portion, the shallow portion having its outer side aligned with the base of said longitudinal groove.

6. In combination with an airplane, a standard with a shaft slidably and rotatively engaged therein, said shaft having a pair of pivotally connected sections arranged with the front section adapted to assume a position at right angles to the rear section, a propeller shaft upon the free end of the front section, resilient means between the shaft sections urging the front section into the right angle position, a stationary casing encircling the rear section of the shaft, a solenoid on said casing for moving the shaft rearwards, an auxiliary engine on the airplane, coupling jaws on the drive shaft of the auxiliary engine and the rear end of said shaft and adapted to engage in the rear position of said shaft, means for holding the said shaft in its rearward position, a manually operable switch, a source of electrical power, and a circuit connecting said solenoid, switch and source of power in series.

JOSE FERNANDEZ.